US012697635B2

(12) United States Patent
Banham et al.

(10) Patent No.: US 12,697,635 B2
(45) Date of Patent: Aug. 4, 2026

(54) PLUMBING SYSTEM

(71) Applicant: KOHLER MIRA LIMITED, Cheltenham (GB)

(72) Inventors: Stuart Banham, Cheltenham (GB); Charlie Parker, Cheltenham (GB); James Bourne, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 608 days.

(21) Appl. No.: 18/166,897

(22) Filed: Feb. 9, 2023

(65) Prior Publication Data

US 2023/0294120 A1 Sep. 21, 2023

(51) Int. Cl.

| | |
|---|---|
| ***B05B 12/04*** | (2006.01) |
| ***B05B 1/16*** | (2006.01) |
| ***B05B 1/18*** | (2006.01) |

(52) U.S. Cl.

CPC ................ *B05B 12/04* (2013.01); *B05B 1/16* (2013.01); *B05B 1/18* (2013.01)

(58) Field of Classification Search

CPC .. B05B 12/04; B05B 1/16; B05B 1/18; B05B 12/02; F17D 1/08; F17D 3/01; F17D 5/00; E03C 1/055; E03C 1/0408; G05D 23/1393; G06F 9/00

See application file for complete search history.

(56) References Cited

U.S. PATENT DOCUMENTS

| | | | |
|---|---|---|---|
| 5,414,879 A | 5/1995 | Hiraishi et al. | |
| 9,988,797 B2 | 6/2018 | Reeder et al. | |
| 2011/0186135 A1* | 8/2011 | Hanna | E03C 1/05 137/1 |
| 2013/0283520 A1 | 10/2013 | Schulte | |
| 2017/0128960 A1 | 5/2017 | D'Urso et al. | |
| 2019/0338961 A1 | 11/2019 | Cimberio et al. | |

FOREIGN PATENT DOCUMENTS

| | | |
|---|---|---|
| CN | 103370481 A | 10/2013 |
| CN | 104820380 A | 8/2015 |
| JP | 2006346360 A | 12/2006 |
| WO | 2011094455 A1 | 8/2011 |

OTHER PUBLICATIONS

European Search Report dated Jul. 20, 2023, issued in corresponding European Application.
Chinese Official Action dated Oct. 30, 2025 issued in corresponding Chinese application.
Chinese Official Action dated May 10, 2026 issued in corresponding Chinese application.
India Official Action dated May 7, 2026 issued in corresponding Indian application.

* cited by examiner

*Primary Examiner* — Qingzhang Zhou
(74) *Attorney, Agent, or Firm* — Husch Blackwell LLP

(57) ABSTRACT

A plumbing system is provided with at least one fluid delivery device having a plurality of spray modes. A controller is also provided to control operation of the fluid delivery device(s) in response to a user input. The controller allows a user to select between one or more scripted user experiences stored on a memory. Each scripted user experience lasts for a predetermined overall length of time, includes one or more switches between spray modes, and comprises a series of two or more program blocks. Each program block comprises instructions for two or more fluid delivery device operating characteristics including water flow rate and temperature. Each program block lasts for a predetermined length of time.

17 Claims, 1 Drawing Sheet

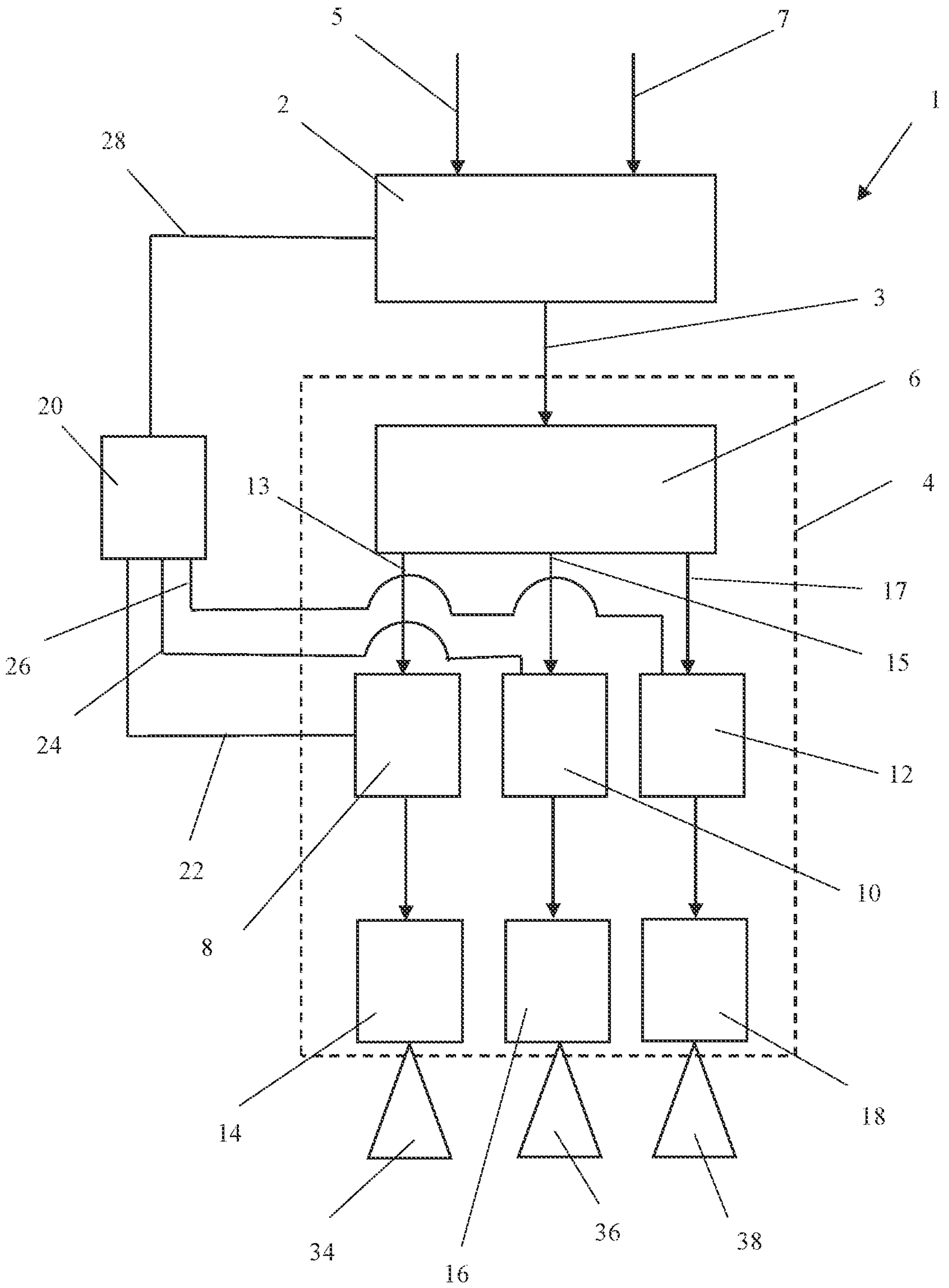
5
7
1
2
28
3
6
20
13
4
17
26
15
24
12
22
10
8
14
18
34
36
38
16

PLUMBING SYSTEM

CROSS REFERENCE

This application claims priority to Great Britain Patent Application No. 2203706.3, filed Mar. 17, 2022, the entireties of which is hereby incorporated by reference.

FIELD OF THE INVENTION

This disclosure relates to a plumbing or an ablutionary system, more particularly a plumbing or an ablutionary system comprising a fluid delivery device, e.g. a spray head, having a plurality of spray modes. The disclosure also relates to the use and methods of operation of such systems.

BRIEF DESCRIPTION OF THE DRAWINGS

Embodiments will now be described, by way of example only, with reference to the accompanying drawings, in which:

FIG. 1 shows schematically an example portion of a shower system.

DETAILED DESCRIPTION OF THE DRAWINGS

Shower systems can be preprogrammed to provide a range of user experiences, to meet, for example, individual user preferences relating to water flow, water temperature and/or shower duration.

The term scripted user experience may be used to refer to a preprogrammed user experience. The user experience is scripted in that, once initiated, it follows a script controlling operation of the shower system from the start to the end of the user experience. Other than selecting a desired scripted user experience, no further action is required from a user to control operation of the shower system during the scripted user experience.

A first aspect provides a plumbing system comprising: at least one fluid delivery device, the fluid delivery device(s) having a plurality of spray modes; and a controller arranged to control operation of the fluid delivery device(s) in response to a user input, wherein the controller is arranged to allow a user to select between one or more scripted user experiences stored on a memory; wherein each scripted user experience lasts for a predetermined overall length of time, includes one or more switches between spray modes and comprises a series of two or more program blocks, wherein each program block comprises instructions for two or more fluid delivery device operating characteristics including water flow rate and temperature and each program block lasts for a predetermined length of time.

In an example implementation, one or more of the water flow rate and/or temperature may be adjusted in one or more of the program blocks in preparation for an upcoming switch from one spray mode to another.

By adjusting one or more of the water flow rate and/or temperature in one or more of the program blocks in preparation for an upcoming switch from one spray mode to another, a smoother user experience may be provided and/or the plumbing system and/or the fluid delivery device operating efficiency may be improved.

The plumbing system may comprise one or more means for delivering a further sensory stimulus, which may be a sensory stimulus mechanism. The sensory stimulus mechanism may include a mechanism for delivering a desired light, sound or smell. The mechanism for delivering a further sensory stimulus may include, for example, one or more lights, one or more speakers or one or more devices for emitting a scent.

One or more of the sensory stimulus mechanisms may be provided by one or more ancillary components of the system. Examples of ancillary components may include lighting components, sound-emitting components or scent-emitting components.

The sensory stimulus mechanisms may be operably coupled to the controller. The controller may be arranged to control operation of the sensory stimulus mechanisms.

One or more of the program blocks may comprise instructions to control at least one operating characteristic of one or more of the sensory stimulus mechanisms. One or more of the sensory stimulus mechanisms may be controlled in tandem with water flow rate and temperature.

Accordingly, the scripted user experience may provide a multisensory experience to the user, in which one or more further sensory stimuli accompany the operation of the fluid delivery device. For instance, different lighting conditions may be programmed for each different spray mode.

The fluid delivery device(s) may have up to or at least five spray modes, up to or at least 10 spray modes, up to or at least 20 spray modes or up to or at least 50 spray modes.

The pre-determined overall length of time may be up to or at least 30 seconds, up to or at least 1 minute, up to or at least 2 minutes, up to or at least 5 minutes, up to or at least 10 minutes, up to or at least 20 minutes or up to or at least 30 minutes.

Each program block may last for up to or at least 1 second, up to or at least 2 seconds, up to or at least 5 seconds, up to or at least 10 seconds, up to or at least 20 seconds, up to or at least 30 seconds, up to or at least 60 seconds or up to or at least 90 seconds.

The plumbing system may be an ablutionary system, e.g. a shower system.

Each spray mode may be a static spray mode or a dynamic spray mode. A static spray mode may comprise a constant spray pattern with a substantially constant water flow rate and temperature. A dynamic spray mode may comprise one or more of a spray pattern that varies in a predetermined way, a water flow rate that varies in a predetermined way and/or a water temperature that varies in a predetermined way.

In an implementation, each spray mode may be delivered by a different set of outlets and/or a different combination of sets of outlets. Each set of outlets may comprise one or more outlets. One or more of the sets of outlets may comprise a plurality of outlets.

In an implementation, each spray mode may comprise a different spray pattern.

In an implementation, the fluid delivery device(s) may comprise a first set of outlets for producing a first spray mode and a second set of outlets for producing a second spray mode. The fluid delivery device(s) may comprise one or more further sets of outlets for producing one or more further spray modes. For instance, the fluid delivery device (s) may comprise a third set of outlets for producing a third spray mode. In addition, the fluid delivery device(s) may comprise a fourth set of outlets for producing a fourth spray mode.

A nozzle may be present in one or more of the outlets.

Switching between spray modes may comprise changing the sets of outlets and/or combination of sets of outlets in operation at a given time. Switching between spray mode may comprise changing the fluid delivery device and/or combination of fluid delivery devices in operation at a given time.

One or more of the fluid delivery devices may include a sprayer, e.g. for a shower. The sprayer may include a spray head. The spray head may be a fixed spray head or a handheld spray head.

The controller may comprise one or more user input devices to allow a user to select between the one or more scripted user experiences stored on the memory. The user input device may comprise, for example, one or more buttons, one or more knobs, one or more dials, one or more bezels, one or more levers and/or a touchscreen. The controller may have a user interface comprising a display.

The controller may be arranged to allow the user to select a non-scripted user experience. When the non-scripted user experience is selected, the fluid delivery devices may not operate in a preprogrammed manner. For instance, a user may choose to operate the plumbing system to provide a non-scripted user experience for an initial period of time followed by a scripted user experience. Similarly, a user may choose to operate the plumbing system to provide a non-scripted user experience for a period of time after a scripted user experience has finished. A user may choose to operate the plumbing system to provide a series of any combination of scripted user experiences and, optionally, non-scripted user experiences.

Another aspect provides a controller for controlling operation of at least one fluid delivery device, the fluid delivery device(s) having a plurality of spray modes, wherein the controller is arranged to control operation of the fluid delivery device(s) in response to a user input, wherein the controller is arranged to allow a user to select between one or more scripted user experiences stored on a memory; wherein each scripted user experience lasts for a predetermined overall length of time, includes one or more switches between spray modes and comprises a series of two or more program blocks, wherein each program block comprises instructions for two or more fluid delivery device operating characteristics including water flow rate and temperature and each program block lasts for a predetermined length of time.

In an example implementation, one or more of the water flow rate and/or temperature may be adjusted in one or more of the program blocks in preparation for an upcoming switch from one spray mode to another.

By adjusting one or more of the water flow rate and/or temperature in one or more of the program blocks in preparation for an upcoming switch from one spray mode to another, a smoother user experience may be provided and/or the plumbing system and/or the fluid delivery device operating efficiency may be improved.

The controller may be arranged to control operation of a sensory stimulus mechanism. The sensory stimulus mechanism may include a mechanism for delivering a desired light, sound or smell. The mechanism for delivering a further sensory stimulus may include, for example, one or more lights, one or more speakers or one or more devices for emitting a scent.

One or more of the program blocks may comprise instructions to control at least one operating characteristic of one or more of the sensory stimulus mechanisms. One or more of the sensory stimulus mechanisms may be controlled in tandem with water flow rate and temperature.

Accordingly, the scripted user experience may provide a multisensory experience to the user, in which one or more further sensory stimuli accompany the operation of the fluid delivery device. For instance, different lighting conditions may be programmed for each different spray mode.

The fluid delivery device(s) may have up to or at least five spray modes, up to or at least 10 spray modes, up to or at least 20 spray modes or up to or at least 50 spray modes.

The pre-determined overall length of time may be up to or at least 30 seconds, up to or at least 1 minute, up to or at least 2 minutes, up to or at least 5 minutes, up to or at least 10 minutes, up to or at least 20 minutes or up to or at least 30 minutes.

Each program block may last for up to or at least 1 second, up to or at least 2 seconds, up to or at least 5 seconds, up to or at least 10 seconds, up to or at least 20 seconds, up to or at least 30 seconds, up to or at least 60 seconds or up to or at least 90 seconds.

Each spray mode may be a static spray mode or a dynamic spray mode. A static spray mode may comprise a constant spray pattern with a substantially constant water flow rate and temperature. A dynamic spray mode may comprise one or more of a spray pattern that varies in a predetermined way, a water flow rate that varies in a predetermined way and/or a water temperature that varies in a predetermined way.

The controller may comprise one or more user input devices to allow a user to select between the one or more scripted user experiences stored on the memory. The user input device may comprise, for example, one or more buttons, one or more knobs, one or more dials, one or more bezels, one or more levers and/or a touchscreen. The controller may have a user interface comprising a display.

The controller may be arranged to allow the user to select a non-scripted user experience. When the non-scripted user experience is selected, the fluid delivery devices may not operate in a preprogrammed manner. For instance, a user may choose to operate the plumbing system to provide a non-scripted user experience for an initial period of time followed by a scripted user experience. Similarly, a user may choose to operate the plumbing system to provide a non-scripted user experience for a period of time after a scripted user experience has finished. A user may choose to operate the plumbing system to provide a series of any combination of scripted user experiences and, optionally, non-scripted user experiences.

Another aspect provides a method of operating a plumbing system comprising: providing at least one fluid delivery device, the fluid delivery device(s) having a plurality of spray modes; providing a controller arranged to control operation of the fluid delivery device(s) in response to a user input, wherein the controller is arranged to allow a user to select between one or more scripted user experiences stored on a memory, wherein each scripted user experience lasts for a predetermined overall length of time, includes one or more switches between spray modes and comprises a series of two or more program blocks, wherein each program block comprises instructions for two or more fluid delivery device operating characteristics including water flow rate and temperature and each program block lasts for a predetermined length of time; and using the controller to select one of the scripted user experiences stored on the memory.

One or more of the water flow rate and/or temperature may be adjusted in one or more of the program blocks in preparation for an upcoming switch from one spray mode to another.

By adjusting one or more of the water flow rate and/or temperature in one or more of the program blocks in preparation for an upcoming switch from one spray mode to another, a smoother user experience may be provided and/or the plumbing system and/or the fluid delivery device operating efficiency may be improved.

The plumbing system may comprise one or more sensory stimulus mechanism. The sensory stimulus mechanism may include a mechanism for delivering a desired light, sound or smell. The sensory stimulus mechanism may include, for example, one or more lights, one or more speakers or one or more devices for emitting a scent.

One or more of the sensory stimulus mechanisms may be provided by one or more ancillary components of the system. Examples of ancillary components may include lighting components, sound-emitting components or scent-emitting components.

The sensory stimulus mechanism may be operably coupled to the controller. The controller may be arranged to control operation of the sensory stimulus mechanism.

One or more of the program blocks may comprise instructions to control at least one operating characteristic of one or more of the sensory stimulus mechanisms. One or more of the sensory stimulus mechanisms may be controlled in tandem with water flow rate and temperature.

Accordingly, the scripted user experience may provide a multisensory experience to the user, in which one or more further sensory stimuli accompany the operation of the fluid delivery device. For instance, different lighting conditions may be programmed for each different spray mode.

The fluid delivery device(s) may have up to or at least five spray modes, up to or at least 10 spray modes, up to or at least 20 spray modes or up to or at least 50 spray modes.

The pre-determined overall length of time may be up to or at least 30 seconds, up to or at least 1 minute, up to or at least 2 minutes, up to or at least 5 minutes, up to or at least 10 minutes, up to or at least 20 minutes or up to or at least 30 minutes.

Each program block may last for up to or at least 1 second, up to or at least 2 seconds, up to or at least 5 seconds, up to or at least 10 seconds, up to or at least 20 seconds, up to or at least 30 seconds, up to or at least 60 seconds or up to or at least 90 seconds.

The plumbing system may be an ablutionary system, e.g. a shower system.

Each spray mode may be a static spray mode or a dynamic spray mode. A static spray mode may comprise a constant spray pattern with a substantially constant water flow rate and temperature. A dynamic spray mode may comprise one or more of a spray pattern that varies in a predetermined way, a water flow rate that varies in a predetermined way and/or a water temperature that varies in a predetermined way.

In an implementation, each spray mode may be delivered by a different set of outlets and/or a different combination of sets of outlets. Each set of outlets may comprise one or more outlets. One or more of the sets of outlets may comprise a plurality of outlets.

In an implementation, each spray mode may comprise a different spray pattern.

In an implementation, the fluid delivery device(s) may comprise a first set of outlets for producing a first spray mode and a second set of outlets for producing a second spray mode. The fluid delivery device(s) may comprise one or more further sets of outlets for producing one or more further spray modes. For instance, the fluid delivery device(s) may comprise a third set of outlets for producing a third spray mode. In addition, the fluid delivery device(s) may comprise a fourth set of outlets for producing a fourth spray mode.

A nozzle may be present in one or more of the outlets.

Switching between spray modes may comprise changing the sets of outlets and/or combination of sets of outlets in operation at a given time. Switching between spray mode may comprise changing the fluid delivery device and/or combination of fluid delivery devices in operation at a given time.

One or more of the fluid delivery devices may include a sprayer, e.g. for a shower. The sprayer may include a spray head. The spray head may be a fixed spray head or a handheld spray head.

The controller may comprise one or more user input devices to allow a user to select between the one or more scripted user experiences stored on the memory. The user input device may comprise, for example, one or more buttons, one or more knobs, one or more dials, one or more bezels, one or more levers and/or a touchscreen. The controller may have a user interface comprising a display.

The controller may be arranged to allow the user to select a non-scripted user experience. When the non-scripted user experience is selected, the fluid delivery devices may not operate in a preprogrammed manner. For instance, a user may choose to operate the plumbing system to provide a non-scripted user experience for an initial period of time followed by a scripted user experience. Similarly, a user may choose to operate the plumbing system to provide a non-scripted user experience for a period of time after a scripted user experience has finished. A user may choose to operate the plumbing system to provide a series of any combination of scripted user experiences and, optionally, non-scripted user experiences.

Another aspect provides a method of programming a scripted user experience for a plumbing system comprising at least one fluid delivery device, the fluid delivery device(s) having a plurality of spray modes, the method comprising: building a series of two or more program blocks, wherein each program block comprises instructions for two or more fluid delivery device operating characteristics including water flow rate and temperature and each program block lasts for a predetermined length of time, in order to generate the scripted user experience, wherein the scripted user experience lasts for a predetermined overall length of time and includes one or more switches between spray modes.

The method may comprise saving the scripted user experience to a memory.

One or more of the water flow rate and/or temperature may be adjusted in one or more of the program blocks in preparation for an upcoming switch from one spray mode to another.

By adjusting one or more of the water flow rate and/or temperature in one or more of the program blocks in preparation for an upcoming switch from one spray mode to another, a smoother user experience may be provided and/or the plumbing system and/or the fluid delivery device operating efficiency may be improved.

One or more of the program blocks may comprise instructions to control at least one operating characteristic of one or more sensory stimulus mechanism. One or more of the sensory stimulus mechanisms may be controlled in tandem with water flow rate and temperature.

Accordingly, the scripted user experience may provide a multisensory experience to the user, in which one or more further sensory stimuli accompany the operation of the fluid delivery device. For instance, different lighting conditions may be programmed for each different spray mode.

The sensory stimulus mechanism may include a mechanism for delivering a desired light, sound or smell. The sensory stimulus mechanism may include, for example, one or more lights, one or more speakers or one or more devices for emitting a scent.

The fluid delivery device(s) may have up to or at least five spray modes, up to or at least 10 spray modes, up to or at least 20 spray modes or up to or at least 50 spray modes.

The pre-determined overall length of time may be up to or at least 30 seconds, up to or at least 1 minute, up to or at least 2 minutes, up to or at least 5 minutes, up to or at least 10 minutes, up to or at least 20 minutes or up to or at least 30 minutes.

Each program block may last for up to or at least 1 second, up to or at least 2 seconds, up to or at least 5 seconds, up to or at least 10 seconds, up to or at least 20 seconds, up to or at least 30 seconds, up to or at least 60 seconds or up to or at least 90 seconds.

The plumbing system may be an ablutionary system, e.g. a shower system.

Each spray mode may be a static spray mode or a dynamic spray mode. A static spray mode may comprise a constant spray pattern with a substantially constant water flow rate and temperature. A dynamic spray mode may comprise one or more of a spray pattern that varies in a predetermined way, a water flow rate that varies in a predetermined way and/or a water temperature that varies in a predetermined way.

In an implementation, each spray mode may be delivered by a different set of outlets and/or a different combination of sets of outlets. Each set of outlets may comprise one or more outlets. One or more of the sets of outlets may comprise a plurality of outlets.

In an implementation, each spray mode may comprise a different spray pattern.

In an implementation, the fluid delivery device(s) may comprise a first set of outlets for producing a first spray mode and a second set of outlets for producing a second spray mode. The fluid delivery device(s) may comprise one or more further sets of outlets for producing one or more further spray modes. For instance, the fluid delivery device(s) may comprise a third set of outlets for producing a third spray mode. In addition, the fluid delivery device(s) may comprise a fourth set of outlets for producing a fourth spray mode.

A nozzle may be present in one or more of the outlets.

Switching between spray modes may comprise changing the sets of outlets and/or combination of sets of outlets in operation at a given time. Switching between spray mode may comprise changing the fluid delivery device and/or combination of fluid delivery devices in operation at a given time.

One or more of the fluid delivery devices may include a sprayer, e.g. for a shower. The sprayer may include a spray head. The spray head may be a fixed spray head or a handheld spray head.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Table 1 below shows a scripted user experience for a shower system. The shower system has a spray head operable to deliver water in any combination of one or more of three spray modes, named in this example as SILK, COVERAGE and STORM. A digital mixer valve is located upstream of the spray head. The digital mixer valve receives a stream of hot water from a hot water supply and a stream of cold water from a cold water supply and is operable to provide a principal stream of water having a desired temperature and flow rate. Each spray mode is delivered by a different set of nozzles. Water flow to each set of nozzles is controlled by an outlet operating valve, e.g. an on-off valve. A controller is operably connected to the digital mixer valve and each one of the outlet operating valves. When running a scripted user experience stored in a memory, a controller controls operation of the digital mixer valve and the outlet operating valve(s) in accordance with the instructions provided by the scripted user experience.

In the example shown in Table 1, the scripted user experience is made up of 49 program blocks. Each program block is five seconds long. The scripted user experience lasts for an overall length of time of 245 seconds.

TABLE 1

Example of a scripted user experience

| | | | | SILK | COVERAGE<br>Outlets | STORM |
|---|---|---|---|---|---|---|
| Step | Time | Temperature | Flow | 3 | 2 | 1 |
| 1 | 0 | 39.00 | 11 | 0 | 1 | 0 |
| 2 | 5 | 38.00 | 11 | 0 | 1 | 0 |
| 3 | 10 | 37.00 | 11 | 0 | 1 | 0 |
| 4 | 15 | 36.00 | 11 | 0 | 1 | 0 |
| 5 | 20 | 36.00 | 10 | 0 | 1 | 0 |
| 6 | 25 | 37.00 | 10 | 0 | 1 | 0 |
| 7 | 30 | 37.00 | 10 | 0 | 1 | 0 |
| 8 | 35 | 38.00 | 10 | 0 | 1 | 0 |
| 9 | 40 | 38.00 | 9 | 0 | 1 | 0 |
| 10 | 45 | 39.00 | 9 | 0 | 1 | 0 |
| 11 | 50 | 39.00 | 9 | 0 | 1 | 0 |
| 12 | 55 | 40.00 | 9 | 0 | 1 | 0 |
| 13 | 60 | 41.00 | 9 | 0 | 1 | 0 |
| 14 | 65 | 42.00 | 6 | 1 | 0 | 0 |
| 15 | 70 | 39.00 | 6 | 1 | 0 | 0 |
| 16 | 75 | 39.00 | 10 | 1 | 0 | 0 |
| 17 | 80 | 42.00 | 6 | 1 | 0 | 0 |
| 18 | 85 | 39.00 | 6 | 1 | 0 | 0 |
| 19 | 90 | 39.00 | 10 | 1 | 0 | 0 |
| 20 | 95 | 42.00 | 6 | 1 | 0 | 0 |
| 21 | 100 | 39.00 | 6 | 1 | 0 | 0 |
| 22 | 105 | 39.00 | 10 | 1 | 0 | 0 |
| 23 | 110 | 40.00 | 6 | 1 | 0 | 0 |
| 24 | 115 | 41.00 | 6 | 1 | 0 | 0 |
| 25 | 120 | 42.00 | 10 | 1 | 0 | 0 |
| 26 | 125 | 41.00 | 5 | 0 | 0 | 1 |
| 27 | 130 | 41.00 | 5 | 0 | 0 | 1 |
| 28 | 135 | 41.00 | 5 | 0 | 0 | 1 |
| 29 | 140 | 41.00 | 5 | 0 | 0 | 1 |
| 30 | 145 | 41.00 | 8 | 0 | 1 | 1 |
| 31 | 150 | 41.00 | 8 | 0 | 1 | 1 |
| 32 | 155 | 40.00 | 9 | 0 | 1 | 1 |
| 33 | 160 | 40.00 | 9 | 0 | 1 | 1 |
| 34 | 165 | 40.00 | 9 | 0 | 1 | 1 |
| 35 | 170 | 40.00 | 9 | 0 | 1 | 1 |
| 36 | 175 | 39.00 | 9 | 0 | 1 | 1 |
| 37 | 180 | 39.00 | 9 | 0 | 1 | 1 |
| 38 | 185 | 39 | 9 | 0 | 1 | 0 |
| 39 | 190 | 39 | 9 | 0 | 1 | 0 |
| 40 | 195 | 39 | 10 | 0 | 1 | 0 |
| 41 | 200 | 38 | 10 | 0 | 1 | 0 |
| 42 | 205 | 38 | 11 | 0 | 1 | 0 |
| 43 | 210 | 38 | 11 | 0 | 1 | 0 |
| 44 | 215 | 38 | 10 | 0 | 1 | 0 |
| 45 | 220 | 39 | 10 | 0 | 1 | 0 |
| 46 | 225 | 39 | 9 | 0 | 1 | 0 |
| 47 | 230 | 39 | 9 | 0 | 1 | 0 |
| 48 | 235 | 39 | 9 | 0 | 1 | 0 |
| 49 | 240 | 0.00 | 0 | 0 | 0 | 0 |

In the left hand column, under the heading Step, the sequential program blocks are numbered. Each row represents a program block.

The cumulative time, measured in seconds, through the scripted user experience at the start of each program block is shown in the second column, under the heading Time.

The water temperature, measured in degrees Celsius (° C.), provided by the digital mixer valve during each program block is shown in the third column, under the heading Temperature.

The water flow rate, indicated by a numerical value where a higher value corresponds with a higher flow rate, provided by the digital mixer valve during each program block is shown in the fourth column, under the heading Flow.

The fifth, sixth and seventh columns represent the outlets for each of the three spray modes SILK, COVERAGE and STORM respectively. For each program block, a 1 in the fifth, sixth and/or seventh column indicates that the respective mode or modes is/are operating. A 0 in the fifth, sixth and/or seventh column indicates that the respective mode or modes is/are not operating.

The example scripted user experience shown in Table 1 may be broken down into a series of five sections, in which a different spray mode or combination of spray modes is/are operating in each section compared with the immediately preceding section.

A first section is made up of the first 13 program blocks. During the first section only the COVERAGE spray mode is operated.

A second section is made up of program blocks 14-25. During the second section only the SILK spray mode is operated.

A third section is made up of program blocks 26-29. During the third section only the STORM spray mode is operated.

A fourth section is made up of program blocks 30-37. During the fourth section the COVERAGE spray mode and the STORM spray mode are operated.

A fifth section is made up of program blocks 38-48. During the fifth section only the COVERAGE spray mode is operated.

The SILK spray mode may be considered a dynamic spray mode. The COVERAGE spray mode and the STORM spray mode may each be considered a dynamic spray mode.

FIG. 1 shows a schematic view of an example of a plumbing system 1 for delivering a scripted user experience.

The plumbing system 1 comprises a digital mixer valve 2 operable to provide a principal stream 3 having a controlled temperature and flow rate. The digital mixer valve 2 receives a first inlet stream 5 of hot water and a second inlet stream 7 of cold water. The digital mixer valve 2 operates to mix the first inlet stream 5 and the second inlet stream 7 in the required proportions to provide the principal stream 3 having a controlled temperature and flow rate.

A manifold 6 is in fluid communication with the digital mixer valve 2. The manifold 6 receives the principal stream 3 at a manifold inlet. The manifold 6 has a first branch leading to a first manifold outlet, a second branch leading to a second manifold outlet and a third branch leading to a third manifold outlet. A first outlet stream 13 exits the first manifold outlet. A second outlet stream 15 exits the second manifold outlet. A third outlet stream 17 exits the third manifold outlet.

A first set of outlets 14 is in fluid communication with the first manifold outlet. The first set of outlets 14 comprises a plurality of outlets. The first set of outlets 14 provides a first spray pattern 34.

A first outlet operating valve 8 is disposed between the manifold 6 and the first set of outlets 14. The first outlet operating valve 8 is operable to permit or prevent flow of the first outlet stream 13 to the first set of outlets 14. In an example implementation, the first outlet operating valve 8 may comprise a solenoid valve, e.g. a bistable solenoid valve.

A second set of outlets 16 is in fluid communication with the second manifold outlet. The second set of outlets 16 comprises a plurality of outlets. The second set of outlets 16 provides a second spray pattern 36.

A second outlet operating valve 10 is disposed between the manifold 6 and the second set of outlets 16. The second outlet operating valve 10 is operable to permit or prevent flow of the second outlet stream 15 to the second set of outlets 16. In an example implementation, the second outlet operating valve 10 may comprise a solenoid valve, e.g. a bistable solenoid valve.

A third set of outlets 18 is in fluid communication with the third manifold outlet. The third set of outlets 18 comprises a plurality of outlets. The third set of outlets 18 provides a third spray pattern 38.

The first spray pattern 34 may, for example, correspond with the SILK spray mode. The second spray pattern 36 may, for example, correspond with the COVERAGE spray mode. The third spray pattern 38 may, for example, correspond with the STORM spray mode.

A third outlet operating valve 12 is disposed between the manifold 6 and the third set of outlets 18. The third outlet operating valve 12 is operable to permit or prevent flow of the third outlet stream 17 to the third set of outlets 18. In an example implementation, the third outlet operating valve 12 may comprise a solenoid valve, e.g. a bistable solenoid valve.

The manifold 6, the first outlet operating valve 8, the second outlet operating valve 10, the third outlet operating valve 12, the first set of outlets 14, the second set of outlets 16 and the third set of outlets 18 are housed within a spray head 4 for an overhead shower. The digital mixer valve 2 may be located remotely from the spray head 4, e.g. in a wall cavity or a ceiling cavity. Alternatively, the digital mixer valve 2 may be housed at least partially within the spray head 4.

An electronic controller 20 is operably connected to the first outlet operating valve 8, the second outlet operating valve 10, the third outlet operating valve 12 and the digital mixer valve 2. The electronic controller 20 may be located remotely from the spray head 4. Alternatively, the electronic controller 20 may be housed at least partially within the spray head 4.

A first data connection 22 connects the first outlet operating valve 8 to the electronic controller 20. The first data connection 22 is configured to carry signals, in use, in both directions between the first outlet operating valve 8 and the electronic controller 20.

A second data connection 24 connects the second outlet operating valve 10 to the electronic controller 20. The second data connection 24 is configured to carry signals, in use, in both directions between the second outlet operating valve 10 and the electronic controller 20.

A third data connection 26 connects the third outlet operating valve 12 to the electronic controller 20. The third data connection 26 is configured to carry signals, in use, in both directions between the third outlet operating valve 12 and the electronic controller 20.

A fourth data connection 28 connects the electronic controller 20 to the digital mixer valve 2. The fourth data connection 28 is configured to carry signals, in use, in both directions between the electronic controller 20 and the digital mixer valve 2.

It will be appreciated that the plumbing system 1 includes a communication link between the first outlet operating valve 8 and the digital mixer valve 2, a communication link between the second outlet operating valve 10 and the digital mixer valve 2 and a communication link between the third outlet operating valve 12 and the digital mixer valve 2.

The controller 20 is arranged to control operation of the spray head 4 in response to a user input. The controller 20 is arranged to allow a user to select between one or more scripted user experiences stored on a memory. Each scripted user experience lasts for a predetermined overall length of time, includes one or more switches between spray modes and comprises a series of two or more program blocks. Each program block comprises instructions for two or more fluid delivery device operating characteristics including water flow rate and temperature and each program block lasts for a predetermined length of time. In some implementations, one or more of the water flow rate and/or temperature is/are adjusted in one or more of the program blocks in preparation for an upcoming switch from one spray mode (e.g. spray pattern) to another.

It will be appreciated that the digital mixer valve 2 is an example of a mechanism operable to provide a principal stream having a controlled temperature and flow rate. Any other mechanism operable to provide a principal stream having a controlled temperature and flow rate may be employed instead of a digital mixer valve. For example, the mechanism operable to provide a principal stream having a controlled temperature and flow rate may include an instantaneous water heater. The instantaneous water heater may receive a single inlet stream of cold water. The instantaneous water heater may operate to heat the cold water and regulate water flow therethrough to provide the principal stream having a controlled temperature and flow rate.

In an example implementation, the spray head 4 may comprise a spray face in which the first set of outlets 14, the second set of outlets 16 and the third set of outlets 18 are at least partially disposed. The spray head 4 may comprise one or more lighting elements operable to emit light, in use. For example, the lighting element(s) may be disposed on or in the vicinity of the spray face.

One or more of the lighting elements may be operably connected to the electronic controller 20. Accordingly, operation of one or more of the lighting elements, e.g. all of the lighting elements, may be controlled in conjunction with operation of the first set of outlets 14, the second set of outlets 16 and the third set of outlets 18. For instance, one or more characteristics of the light emitted by one or more of the lighting elements may be varied, in use, depending upon which combination of the first set of outlets 14, the second set of outlets 16 and the third set of outlets 18 is in operation at any given time. Alternatively or additionally, one or more characteristics of the light emitted by one or more of the lighting elements may be varied, in use, depending upon the temperature of the water, e.g. the temperature of the principal stream. The characteristic(s) of the light emitted by one or more of the lighting elements that may be varied, in use, may include, for example, colour, brightness, intensity, sequence or pattern, e.g. a pulsed or flashing pattern.

By controlling one or more of the characteristics of the light emitted by one or more of the lighting elements in conjunction with operation of the first set of outlets, the second set of outlets and the third set of outlets, the plumbing system may provide a user with additional information, e.g. visual information relating to water temperature, and/or a multi-sensory experience.

In an example implementation, one of the lighting elements may extend completely around a perimeter of the spray face. The lighting element extending completely around the perimeter of the spray face may be an annular lighting element or a light ring.

One or more of the lighting elements may comprise one or more light emitting diodes (LEDs).

It will be appreciated that the lighting element(s) may be an example of a sensory stimulus mechanism.

Electrical power may be required to operate various components of the plumbing system, for example the solenoid valve(s) and/or the lighting element(s), if present. For instance, electrical power may be supplied to one or more components housed within the spray head 4 from a remote power source such as a mains electricity supply. Alternatively or additionally, electrical power may be supplied to one or more components housed within the spray head 4 from a local power source, e.g. one or more batteries disposed at least partially within the spray head 4. One or more of the batteries may be rechargeable.

In another implementation, the plumbing system may comprise one or more turbine generators arranged to be driven, in use, by the principal stream, the first outlet stream, the second outlet stream and/or the third outlet stream. Electricity produced by the turbine generator(s) may be utilised, for example, to charge a battery and/or to power one or more lighting elements.

The turbine generator(s) may be housed at least partially within the spray head 4.

An example operation of the plumbing system 1 to deliver a scripted user experience will now be described.

In use, a user may operate the controller 20 to select one of the scripted user experiences stored in the memory. As the scripted user experience progresses, the controller 20 sends signals to the digital mixer valve 2, the first outlet operating valve 8, the second outlet operating valve 10 and the third outlet operating valve 12, via the fourth data connection 28, the first data connection 22, the second data connection 24 and the third data connection 26 respectively, as required, in order to deliver the scripted user experience.

In some implementations, the scripted user experience may be a multi-sensory experience.

Accordingly, the plumbing system may comprise one or more sensory stimulus mechanism. The sensory stimulus mechanism may include a mechanism for delivering a desired light, sound or smell. The sensory stimulus mechanism may include, for example, one or more lights, one or more speakers or one or more devices for emitting a scent.

One or more of the sensory stimulus mechanism may be provided by one or more ancillary components of the plumbing system. Examples of ancillary components may include lighting components, sound-emitting components or scent-emitting components.

The sensory stimulus mechanism may be operably coupled to the controller. The controller may be arranged to control operation of the sensory stimulus mechanism.

One or more of the program blocks may comprise instructions to control at least one operating characteristic of one or more of the sensory stimulus mechanism. One or more of the sensory stimulus mechanisms may be controlled in tandem with water flow rate and/or temperature.

Accordingly, the scripted user experience may provide a multisensory experience to the user, in which one or more further sensory stimuli accompany the operation of the spray head. For instance, different lighting conditions may be programmed for each different spray mode.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A plumbing system comprising:

at least one fluid delivery device having a plurality of spray modes; and a controller configured to control operation of the at least one fluid delivery device in response to a user input, wherein the controller is configured to allow a user to select between one or more scripted user experiences stored on a memory;

wherein each scripted user experience:

lasts for a predetermined overall length of time, includes one or more switches between spray modes, and comprises a series of two or more program blocks, wherein each program block comprises instructions for two or more fluid delivery device operating characteristics including water flow rate and temperature, and each program block lasts for a predetermined length of time, and wherein at least one of the water flow rate and temperature is adjusted in one or more of the program blocks in preparation for an upcoming switch from one spray mode to another.

2. A plumbing system according to claim 1, further including one or more sensory stimulus mechanisms.

3. A plumbing system according to claim 2, wherein the one or more sensory stimulus mechanisms includes a mechanism for delivering a desired light, sound or smell.

4. A plumbing system according to claim 2, wherein the sensory stimulus mechanism is operably coupled to the controller.

5. A plumbing system according to claim 4, wherein one or more of the program blocks include instructions to control at least one operating characteristic of one or more of the sensory stimulus mechanism.

6. A plumbing system according to claim 1, wherein the at least one fluid delivery device has up to 50 spray modes.

7. A plumbing system according to claim 1, wherein the pre-determined overall length of time is up to 30 minutes.

8. A plumbing system according to claim 1, wherein each program block lasts for up to 90 seconds.

9. A plumbing system according to claim 1, wherein each spray mode is a static spray mode or a dynamic spray mode.

10. A plumbing system according to claim 1, wherein each spray mode is delivered by a different set of outlets and/or a different combination of sets of outlets.

11. A plumbing system according to claim 1, wherein one or more of the fluid delivery devices includes a sprayer.

12. A plumbing system according claim 1, wherein the controller comprises one or more user input devices to allow a user to select between the one or more scripted user experiences stored on the memory.

13. A method comprising:

providing at least one fluid delivery device, the at least one fluid delivery device having a plurality of spray modes;

providing a controller arranged to control operation of the at least one fluid delivery device in response to a user input, allowing, via the controller, a user to select between one or more scripted user experiences stored on a memory, wherein each scripted user experience:

lasts for a predetermined overall length of time, includes one or more switches between spray modes, and comprises a series of two or more program blocks, wherein each program block comprises instructions for two or more fluid delivery device operating characteristics including water flow rate and temperature, and each program block lasts for a predetermined length of time, and wherein at least one of the water flow rate and temperature is adjusted in one or more of the program blocks in preparation for an upcoming switch from one spray mode to another; and instructing, by the controller, one of the scripted user experience stored on the memory to run, based on the selection made by the user.

14. The method of claim 12, wherein one or more sensory stimulus mechanisms are also provided.

15. The method of claim 14, wherein the one or more sensory stimulus mechanisms includes a mechanism for delivering a desired light, sound or smell.

16. The method of claim 14, wherein the sensory stimulus mechanism is operably coupled to a controller.

17. A plumbing system according to claim 16, wherein one or more of the program blocks include instructions to control at least one operating characteristic of one or more of the sensory stimulus mechanism.

* * * * *